C. A. Robinson,
Hay Press.
No. 112,966.    Patented Feb. 21, 1871.

Witnesses
Jno. A. Ellis
J. A. White

Inventor
Charles A. Robinson
Per
J. H. Alexander
Atty.

United States Patent Office.

CHARLES A. ROBINSON, OF FLORENCE, INDIANA.

Letters Patent No. 112,966, dated March 21, 1871.

IMPROVEMENT IN HAY AND COTTON-PRESSES.

The Schedule referred to in these Letters Patent and making part of the same.

*To all whom it may concern:*

Be it known that I, CHARLES A. ROBINSON, of Florence, in the county of Switzerland and State of Indiana, have invented certain new and useful Improvements in Hay-Press; and that I do hereby declare that the following is a full, clear, and exact description thereof, reference being had to the accompanying drawing and to the letters of reference marked thereon which form a part of this specification.

The nature of my invention consists in the construction and arrangement of a portable hay and cotton-press, as will be hereinafter fully set forth.

In order to enable others skilled in the art to which my invention appertains to make and use the same, I will now proceed to describe its construction and operation, referring to the annexed drawing, in which—

Figure 1:
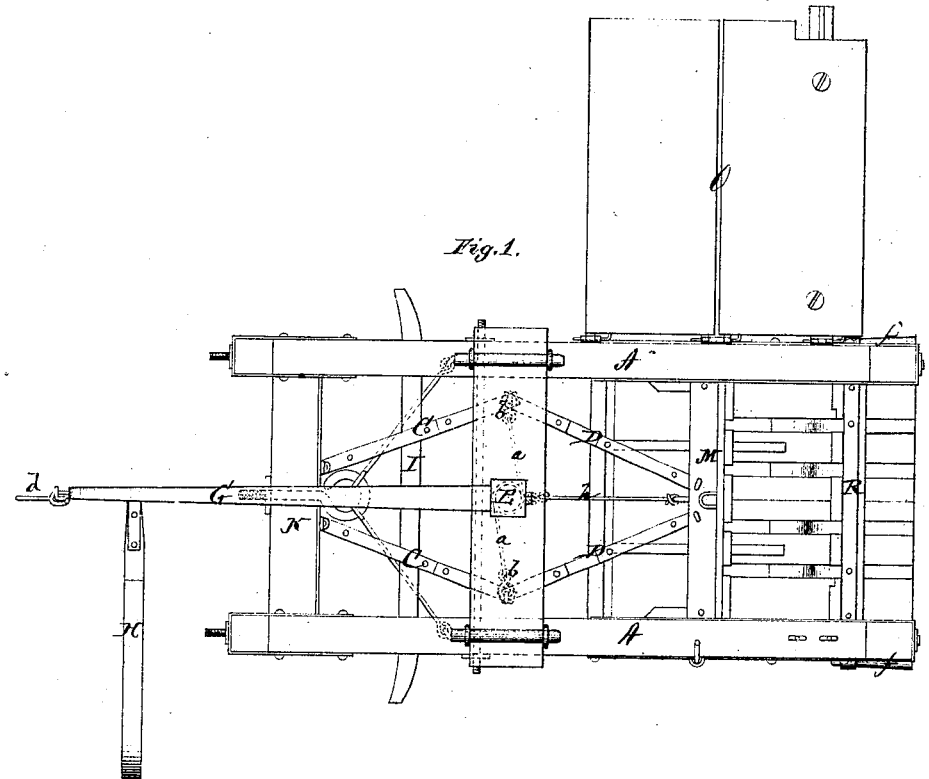
Figure 2:
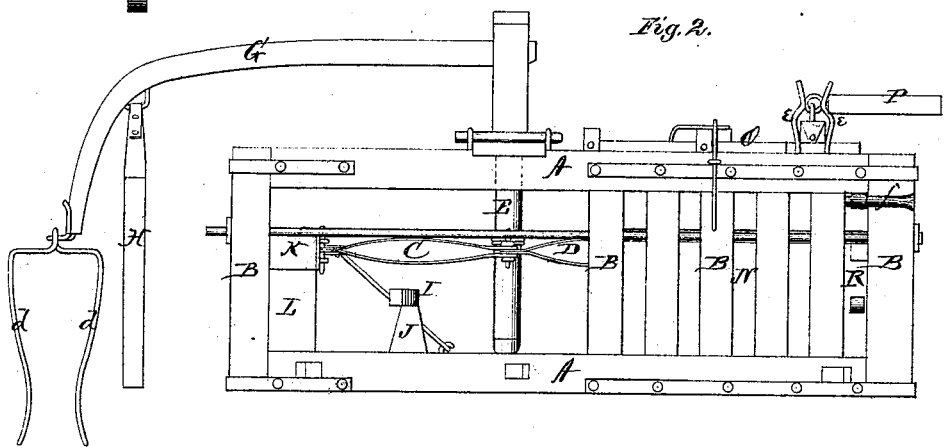

Figure 1 is a plan view, and
Figure 2, a side elevation of my press.

The frame of my press is composed of horizontal beams A A, connected by vertical bars B B.

Two of the beams A A and a suitable number of bars B B form one side of the frame, which is further strengthened by one or more rods passing from end to end.

The two sides are then connected by suitable cross-bars, and also strengthened by rods.

The power of my press is obtained from four levers C C and D D, attached together, as shown, and worked by a rope, $a$.

This rope is attached to a clevis, $b$, where the two levers C D, on each side, are joined together, and from thence it leads to a windlass, E, which is worked by a sweep, G, having one horse attached to it at the shafts $d\ d$.

Attached to the sweep G is a trailing-brace, H, to prevent any giving back when the horse stops.

I is a slide for the levers C D to rest upon, said slide being supported on the posts J J.

K is the fulcrum, to which the levers C C are attached, supported by two posts L L, one at each corner.

M is the follower, attached to the levers D D, and which, when forced up in the box N, forms the bale of hay or cotton, said bale being then bound together with hoops of wood, wire, or rope.

O O are the doors on top, which open to admit the loose hay or cotton, and closed with latches $e\ e$, when pressing.

In the bottom of the bale-box N are four drop-braces or sills, which support the bottom, and can be taken out at will.

On the top of the door O is a brace, P, upon which the door rests when open, and when shut and the bale pressed this brace is turned and placed between the latches $e\ e$ and pressed down, which springs the latches apart so as to open the door.

The end R of the bale-box is fastened by keys $f\ f$, as shown.

The press is intended to be bound together with hog-chains, one on each side, to prevent it from spreading while pressing.

The follower M is withdrawn, after the bale is pressed, by a rope, $h$, connecting it with the windlass E, and wound around said windlass in the opposite direction from the rope $a$.

Having thus fully described my invention,
What I claim as new, and desire to secure by Letters Patent, is—

1. In the cotton or hay-press herein described, the brace H on sweep G, in combination with shaft E and levers C D, all arranged as set forth.

2. The within-described cotton or hay-press, consisting of frame A, box N, levers C D, windlass E, sweep G, brace H, lever-rest I, and follower M, all constructed and arranged as described.

In testimony that I claim the foregoing as my own I affix my signature in presence of two witnesses.

C. A. ROBINSON.

Witnesses:
SIMON BEYMER,
WM. WOODRUFF.